(No Model.)

G. R. BUFFHAM.
WINDOW VENTILATOR.

No. 415,378.  Patented Nov. 19, 1889.

Witnesses
Chas H Smith
J. Staib

Inventor
George R. Buffham
per Lemuel W. Serrell
atty

UNITED STATES PATENT OFFICE.

GEORGE R. BUFFHAM, OF PORT CHESTER, NEW YORK.

WINDOW-VENTILATOR.

SPECIFICATION forming part of Letters Patent No. 415,378, dated November 19, 1889.

Application filed September 29, 1888. Serial No. 286,711. (No model.)

*To all whom it may concern:*

Be it known that I, GEORGE R. BUFFHAM, of Port Chester, in the county of Westchester and State of New York, have invented an Improvement in Window-Ventilators, of which the following is a specification.

This invention is an improvement upon that for which Letters Patent No. 349,782 were granted to me September 28, 1886. I make use of a fixed ring set into the glass or the frame-work holding various-colored glasses, and within this fixed ring is a stationary frame holding glasses that form one portion or disk of the ventilator. The other portion or disk of the ventilator, which is movable, is composed of a series of frames containing glasses with intermediate openings, which can be turned in such a manner as to coincide with the glasses in the fixed frame and thereby open the ventilator, or it can be turned so that the glasses in the movable frame cover the openings between the glasses and the fixed frames, and thereby close the ventilator, and the central portion of the ventilator is a circular ring or bezel holding a glass. By this improvement the construction of the ventilator is simplified and rendered highly ornamental, and the parts composing the frames are easily set together, and the glasses can be molded so as to be of a uniform size and shape to set into the respective frames.

Figure 1:
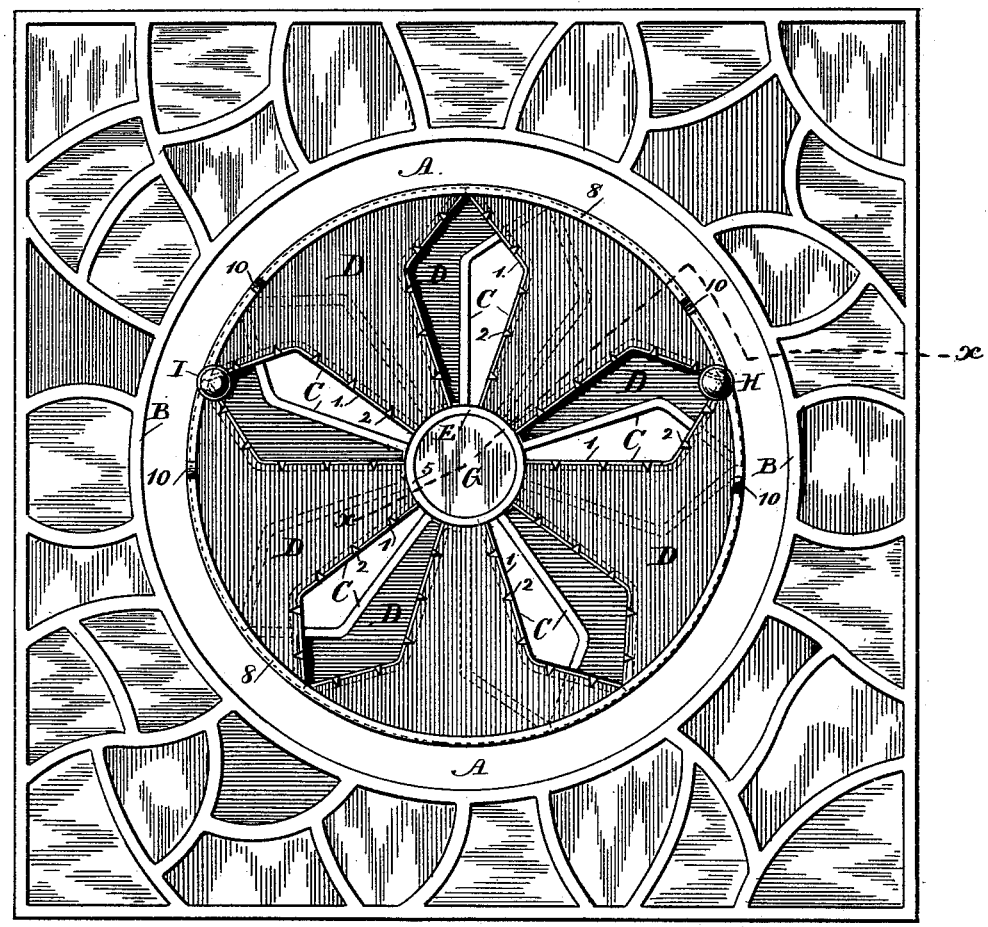
Figure 2:
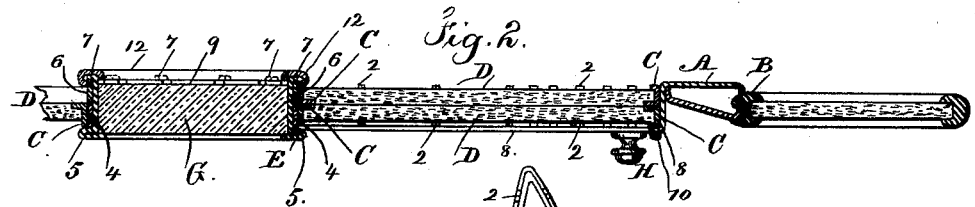

In the drawings, Figure 1 is an elevation of the ventilator complete. Fig. 2 is a section in larger size through one side of the ventilator at about the line *x x* of Fig. 1; and Fig. 3 shows one of the metal frames for holding the glass of the ventilator, and the center bezel is also shown in this figure.

The fixed ring A is of metal, and it is sesecured within an opening in the glass or window to be ventilated. Where the window is composed of "art glass" of different colors set into metal strips or frames, the fixed ring A will be secured to the circular frame B of the art glass, as represented in the drawings.

Figure 3:
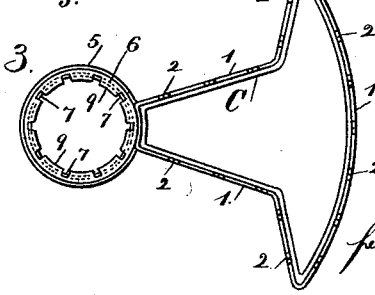

The metallic frames receiving the glasses of the ventilator are each made as illustrated in Fig. 3. Each frame is by preference stamped out of a metallic sheet, with the outer edges bent up to form flanges 1, that are provided at intervals with projecting points 2, that are bent over upon the surface of the glass for holding the same in position. Each glass D is of a shape to fit into the frame C, and it is preferably cast into a mold, so as to be recessed on the surface near the edges, in order that the surface of the glass and the frame may be level. These frames C do not extend to the center of the ventilator, but they surround a short cylinder or central bezel E, and the sides of the frame C occupy radial positions from the center of the bezel E and then flare outwardly to the arc, forming the outer part of each frame. The frames which are represented are of a size to occupy one-fifth of the circumference of the ventilator, and in making up the ventilator ten of these frames are made use of, five of them being attached permanently at their edges to the fixed ring A, and five of them being connected together at the ends of the arcs and to a central ring 4 around the bezel E, so as to form the movable circle or disk of the ventilator.

In constructing this ventilator it is preferable to make a center bezel E with a returned flange 5 to form an edge that retains the ring 4, and there is a second ring 6 around the central bezel E, to which the inner ends of the frames C are firmly soldered, and this ring 6 should have an inwardly turned and notched flange 9, and upon the edge of the central bezel E there are spurs 7, that pass into the notches in the flange 9 of the ring 6.

In putting the parts of this ventilator together it is preferable to insert the glasses into the respective frames C and bend over the points 2, or sufficient of them for holding the glasses D in the respective frames, and the frames C, that form a movable portion of the ventilator, are attached to the ring 4, and also the angles of the frames C at the ends of the curved arcs are soldered or otherwise fastened together. The circle or disk composed of these frames set together is now placed within the fixed ring A, and it lies against the inward flange 8 of the fixed ring A. The similar disk or circle of frames and glasses soldered together at the ends of the arcs and at the central portions to the ring 6 is now laid upon the circle of frames and glasses before described, and within the fixed ring A and the central bezel E is passed through the ring 4, and also through the ring 6, and the spurs 7 pass into the notches of the inwardly-turned flange 9 of the ring 6, after which these spurs 7 are to be turned over outwardly to hold the ring 6 permanently upon the central bezel E, and the outer edges of the frames C are to be permanently fastened into the fixed ring A by solder or otherwise. The central bezel E can be left open if constant ventilation is desired to the extent of this opening; otherwise a circular glass G is to be introduced into this central bezel E before the ring 6 is attached thereto. Thereby the central glass G is retained between the returned flange 5 and the flange 9 of the ring 6. The movable disk or ring of the ventilator may be partially rotated upon or against the fixed portion of the ventilator by hand or by cords or wires. For this purpose I prefer to make use of knobs H I at opposite sides of the movable portion of the ventilator, which may be acted upon by hand or by cords or wires hanging from the same.

By the peculiar construction of the frames C the glasses are held very firmly in position, and there are diamond-shaped openings in both the fixed and movable portions or disks of the ventilator between the respective glasses, and these diamond-shaped openings in the movable disk of the ventilator can be made to coincide with the similarly-shaped openings in the stationary disk of the ventilator, thereby opening such ventilator, or the movable disk of the ventilator can be turned to partially or entirely close such openings, and the ventilator is highly ornamented and the radial bars of the frames C coincide when the ventilator is either entirely open or entirely closed. Thereby such frames obstruct the light but little, and the ventilator closes very tightly, because the radial portions of the frames C coincide and the tapering or diamond-shaped portions of the frames at the openings rest upon the surfaces of the respective glasses in the opposite disk of the ventilator; and in order to render the ventilator ornamental to correspond with the art glasses surrounding the same the glasses set in the separate frames may vary in color, as desired, and these glasses, together with the central circular glass, may be transparent, ground, or opalescent.

Upon the flange 8 stops 10 should be fastened at the proper points to limit the movement of the movable disk of the ventilator by the knobs H I coming in contact with the same, so that the movable disk of the ventilator can only be turned a proper distance either to open or close said ventilator.

It is to be understood that the respective frames C can be soldered to the ring 4 and at the ends of the arc portions of the frames before the glasses are put in, if desired, and the same mode of procedure may be followed in connection with the frames C that are soldered to the ring 6, and, if desired, an ornamental metal ring 12 may be applied to cover up the spurs 7 and notched flange 9 and render the ventilator more ornamental at this side thereof.

I claim as my invention—

1. The sheet-metal frames C, having projecting points, in combination with the glasses inserted into such frames and secured by the points that are turned over the edges of the same, and the surrounding and open central rings to which such frames are connected for forming the stationary and movable disks of the ventilator, substantially as set forth.

2. The metal frames C and the respective glasses within the same, in combination with the rings 4 and 6, to which the respective frames C are fastened to form the ventilator-disks, the fixed flanged ring A, within which the two disks are received, and a central glass within the rings, substantially as set forth.

3. The central bezel E, having a returned flange 5 and spurs 7, in combination with the ring 6, secured by the said spurs, and the movable ring 4, surrounding the central bezel, the glasses and the frames C, attached to the rings 4 and 6, respectively, and forming the ventilating-disks, and the fixed flanged ring A, within which the ventilator-disks are received, substantially as set forth.

4. The combination, with the ventilator-disks having glasses and metal frames carrying the glasses, of the fixed flanged ring A, within which the ventilator-disks are received, the art glasses surrounding such ventilator, and the metal frames attached to the fixed ring A and receiving the art glasses, substantially as set forth.

Signed by me this 25th day of September, 1888.

GEO. R. BUFFHAM.

Witnesses:
A. W. STOCKETT,
W. BREHEAD.